(12) United States Patent
Wada

(10) Patent No.: US 9,895,977 B2
(45) Date of Patent: Feb. 20, 2018

(54) ARTICLE TRANSPORT FACILITY

(71) Applicant: Daifuku Co., Ltd., Osaka-shi (JP)

(72) Inventor: Yoshinari Wada, Shiga (JP)

(73) Assignee: Daifuku Co., Ltd., Osaka-shi (JP)

( * ) Notice: Subject to any disclaimer, the term of this patent is extended or adjusted under 35 U.S.C. 154(b) by 63 days.

(21) Appl. No.: 15/151,651

(22) Filed: May 11, 2016

(65) Prior Publication Data

US 2016/0332523 A1 Nov. 17, 2016

(30) Foreign Application Priority Data

May 13, 2015 (JP) .................................. 2015-098232

(51) Int. Cl.
| | |
|---|---|
| *B60L 5/00* | (2006.01) |
| *B65G 35/06* | (2006.01) |
| *B61B 3/02* | (2006.01) |
| *B60M 7/00* | (2006.01) |

(52) U.S. Cl.
CPC ............... *B60L 5/005* (2013.01); *B60M 7/00* (2013.01); *B61B 3/02* (2013.01); *B65G 35/06* (2013.01); *B60L 2200/26* (2013.01)

(58) Field of Classification Search
CPC . A63H 18/12; B60L 5/005; B60L 5/39; B60L 2200/26; B60L 23/002; B61B 13/00; B61B 13/04; B61B 13/08; B61B 13/127; B61B 1/00; H01L 21/67715; H01L 21/67727; H01L 21/6773; H01L 21/67733; H01L 21/67736; H01L 21/67259
USPC ... 104/88.01–88.04, 89, 90, 91, 96, 97, 288, 104/287, 300, 130.01; 105/52–54, 61
See application file for complete search history.

(56) References Cited

U.S. PATENT DOCUMENTS

| | | | | |
|---|---|---|---|---|
| 5,540,319 | A * | 7/1996 | Orisaka ................. | B61B 13/127 198/465.2 |
| 5,794,534 | A * | 8/1998 | Enderlein ................ | B07C 3/08 104/89 |
| 5,893,437 | A | 4/1999 | Odachi et al. | |
| 6,220,173 | B1 * | 4/2001 | Sauerwein ............ | B61L 23/002 104/106 |
| 6,591,961 | B2 * | 7/2003 | Fukushima ............. | B61B 13/00 198/346.1 |
| 6,629,502 | B2 * | 10/2003 | Matsukawa ............. | B61B 13/00 104/130.01 |
| 6,655,297 | B2 * | 12/2003 | Kawato ..................... | B61J 1/06 104/96 |

(Continued)

FOREIGN PATENT DOCUMENTS

| | | |
|---|---|---|
| JP | 8205309 A | 8/1996 |
| JP | 2000142386 A | 5/2000 |
| JP | 2011116313 A | 6/2011 |

*Primary Examiner* — Jason C Smith

(74) *Attorney, Agent, or Firm* — The Webb Law Firm

(57) ABSTRACT

An article transport vehicle includes a transport vehicle main body, a first travel portion, a second travel portion, and power-receiving portions for receiving driving electric power without contact from one or more electricity supply lines. The first travel portion rotatably supports a transport vehicle main body. The second travel portion rotatably supports the transport vehicle main body. The power-receiving portions include a first power-receiving portion which is configured to be rotated integrally with the first travel portion, and a second power-receiving portion which is configured to be rotated integrally with the second travel portion.

6 Claims, 8 Drawing Sheets

(56) References Cited

U.S. PATENT DOCUMENTS

| | | | | |
|---|---|---|---|---|
| 6,851,913 B2* | 2/2005 | Iizuka | B66C 1/28 | 414/626 |
| 7,210,589 B2* | 5/2007 | Iizuka | B66C 13/06 | 212/270 |
| 7,845,284 B2* | 12/2010 | Izumi | B65G 17/20 | 104/88.02 |
| 8,245,647 B2* | 8/2012 | Oguro | H01L 21/67715 | 104/130.01 |
| 8,322,287 B2* | 12/2012 | Oguro | B65G 37/02 | 104/88.01 |
| 2002/0104726 A1* | 8/2002 | Kuzuya | B60L 5/005 | 191/6 |
| 2003/0077159 A1* | 4/2003 | Iizuka | B66C 1/28 | 414/609 |
| 2004/0025739 A1* | 2/2004 | Matsukawa | B61B 13/00 | 104/96 |
| 2004/0253087 A1* | 12/2004 | Iizuka | B66C 13/06 | 414/626 |
| 2005/0005808 A1* | 1/2005 | Wakabayashi | H01L 21/67276 | 104/88.01 |
| 2005/0139114 A1* | 6/2005 | Nakao | B61B 13/04 | 104/96 |
| 2006/0016363 A1* | 1/2006 | Nakao | G05D 1/0229 | 104/88.01 |
| 2006/0230975 A1* | 10/2006 | Shiwaku | B61B 1/00 | 104/88.01 |
| 2009/0000505 A1* | 1/2009 | Shimamura | B61B 13/00 | 104/88.02 |
| 2010/0242783 A1* | 9/2010 | Oguro | B65G 37/02 | 104/91 |
| 2010/0242784 A1* | 9/2010 | Oguro | H01L 21/67715 | 104/130.01 |
| 2011/0061559 A1* | 3/2011 | Lund | B60L 5/36 | 104/119 |
| 2012/0305364 A1* | 12/2012 | Morimoto | H01L 21/67727 | 198/370.01 |
| 2012/0312188 A1* | 12/2012 | Inui | B60L 5/005 | 104/288 |
| 2013/0213755 A1* | 8/2013 | Shibata | B61B 3/02 | 191/22 R |
| 2015/0020343 A1* | 1/2015 | Shibata | B65G 45/22 | 15/306.1 |
| 2016/0031460 A1* | 2/2016 | Izumi | B61B 13/00 | 104/88.01 |
| 2016/0240417 A1* | 8/2016 | Tomida | B66C 15/045 | |
| 2016/0257498 A1* | 9/2016 | Murakami | B61B 3/02 | |
| 2016/0280239 A1* | 9/2016 | Takada | B61B 3/02 | |
| 2016/0288802 A1* | 10/2016 | Kinugawa | B61B 3/02 | |
| 2016/0332523 A1* | 11/2016 | Wada | B60L 5/005 | |
| 2017/0002523 A1* | 1/2017 | Ogisu | B61B 3/02 | |
| 2017/0008700 A1* | 1/2017 | Wada | B61B 3/02 | |

* cited by examiner

ARTICLE TRANSPORT FACILITY

CROSS-REFERENCE TO RELATED APPLICATION

This application claims priority to Japanese Patent Application No. 2015-098232 filed May 13, 2015, the disclosure of which is hereby incorporated in its entirety by reference.

FIELD OF THE INVENTION

The present invention relates to an article transport facility comprising a travel rail installed along a travel path, an article transport vehicle configured to be guided by the travel rail to travel along the travel path, wherein the travel path includes a straight portion which extends straight and a curved portion which is curved, wherein the article transport vehicle includes a transport vehicle main body, a first travel portion having a first travel wheel, a second travel portion having a second travel wheel and being spaced apart from the first travel portion along a travel direction, and power-receiving portions for receiving driving electric power, without contact, from one or more electricity supply lines installed along the travel path.

BACKGROUND

An example of article transport facilities such as one described above is disclosed in JP Publication of Application No. 2011-116313 (Patent Document 1). In an article transport facility of Patent Document 1, an article transport vehicle includes a pair of travel portions, namely, a first travel portion and a second travel portion. Each portion of the pair of travel portions supports a transport vehicle main body such that each can be rotated independently about a corresponding vertical axis. The reason that each portion of the pair of travel portions supports the transport vehicle main body for independent rotation about a vertical axis is to allow the article transport vehicle to smoothly travel through curved portions of the travel path in addition to straight portions of the travel path.

In addition, in the article transport facility of Patent Document 1, a power-receiving portion of the article transport vehicle is supported by the transport vehicle main body at a location between the first travel portion and the second travel portion. Thus, with the power-receiving portion located between the first travel portion and the second travel portion, when the article transport vehicle travels through a curved portion, the power-receiving portion becomes displaced radially inward during the travel through the curved portion of the travel path, which reduces the efficiency with which the power-receiving portion receives power from electricity supply lines. This can cause the article transport vehicle to not receive sufficient electric power necessary for it to continue traveling.

Thus, in the conventional article transport facility described above, the power-receiving portion of the article transport vehicle is supported by the vehicle main body for sliding movement along a vehicle body lateral direction which is perpendicular in plan view to a vehicle body fore and aft direction which is the direction of travel of the article transport vehicle. The first travel portion and the power-receiving portion are operatively connected to each other by an operatively connecting mechanism such that the power-receiving portion slides radially outward when in the curved portion and in synchronization with the rotation of the first travel portion about its vertical axis.

SUMMARY OF THE INVENTION

In the article transport facility of Patent Document 1, it is necessary to provide the operatively connecting mechanism for causing the power-receiving portion to slide in the vehicle body lateral direction in order to change the position of the power-receiving portion as the first travel portion rotates about its vertical axis when the article transport vehicle travels through a curved portion. This caused the structure of the article transport vehicle to be complicated in the article transport facility of Patent Document 1.

Thus, an article transport facility is desired in which the position of a power-receiving portion can be changed by a simple structure when the article transport vehicle travels through a curved portion of a path.

A characteristic arrangement of an article transport facility invented in light of the above comprises a travel rail installed along a travel path; an article transport vehicle configured to be guided by the travel rail to travel along the travel path; wherein the travel path includes a straight portion which extends straight and a curved portion which is curved, wherein the article transport vehicle includes a transport vehicle main body, a first travel portion having a first travel wheel, a second travel portion having a second travel wheel, and power-receiving portions for receiving driving electric power, without contact, from one or more electricity supply lines installed along the travel path, wherein the first travel portion and the second travel portion are spaced apart from each other along a travel direction of the article transport vehicle, wherein the first travel wheel is provided to the first travel portion such that the first travel wheel can roll on a travel surface of the travel rail, wherein the first travel portion supports the transport vehicle main body through a first support mechanism and is guided by the travel rail, wherein the first travel portion supports the first support mechanism for rotation about a first axis which extends along a vertical direction, wherein the first axis is so located to overlap with the first travel portion as seen along the vertical direction, wherein the second travel wheel is provided to the second travel portion such that the second travel wheel can roll on the travel surface of the travel rail, wherein the second travel portion supports the transport vehicle main body through a second support mechanism and is guided by the travel rail, wherein the second travel portion supports the second support mechanism for rotation about a second axis which extends along a vertical direction, wherein the second axis is so located to overlap with the second travel portion as seen along the vertical direction, and wherein the power-receiving portions include one or more first power-receiving portions which are configured to be rotated integrally with the first travel portion about the first axis, and one or more second power-receiving portions which are configured to be rotated integrally with the second travel portion about the second axis.

As such, when the article transport vehicle travels from a straight portion of the travel path into a curved portion, the first travel portion and the second travel portion travel along the curved portion with the first travel portion rotated about the first axis and with the second travel portion rotated about the second axis.

As this takes place, the one or more first power-receiving portions are rotated integrally with the first travel portion about the first axis whereas the one or more second power-receiving portions are rotated integrally with the second travel portion about the second axis so that the orientations of the one or more first power-receiving portions and the one or more second power-receiving portions can be changed to match the arrangement of the one or more electricity supply lines in the curved portion.

The arrangement for causing the one or more first power-receiving portions to be rotated integrally with the first travel portion about the first axis and the arrangement for causing the one or more second power-receiving portions to be rotated integrally with the second travel portion about the second axis may be achieved by a simple structure, for example, by fixing the one or more first power-receiving portions to the first travel portion, and fixing the one or more second power-receiving portions to the second travel portion. Thus, an article transport facility is provided in which positions of power-receiving portions can be changed by a simple structure when the article transport vehicle travels through a curved portion of a path.

DETAILED DESCRIPTION

Embodiments of an article transport facility are described next with reference to the drawings.

Figure 1:
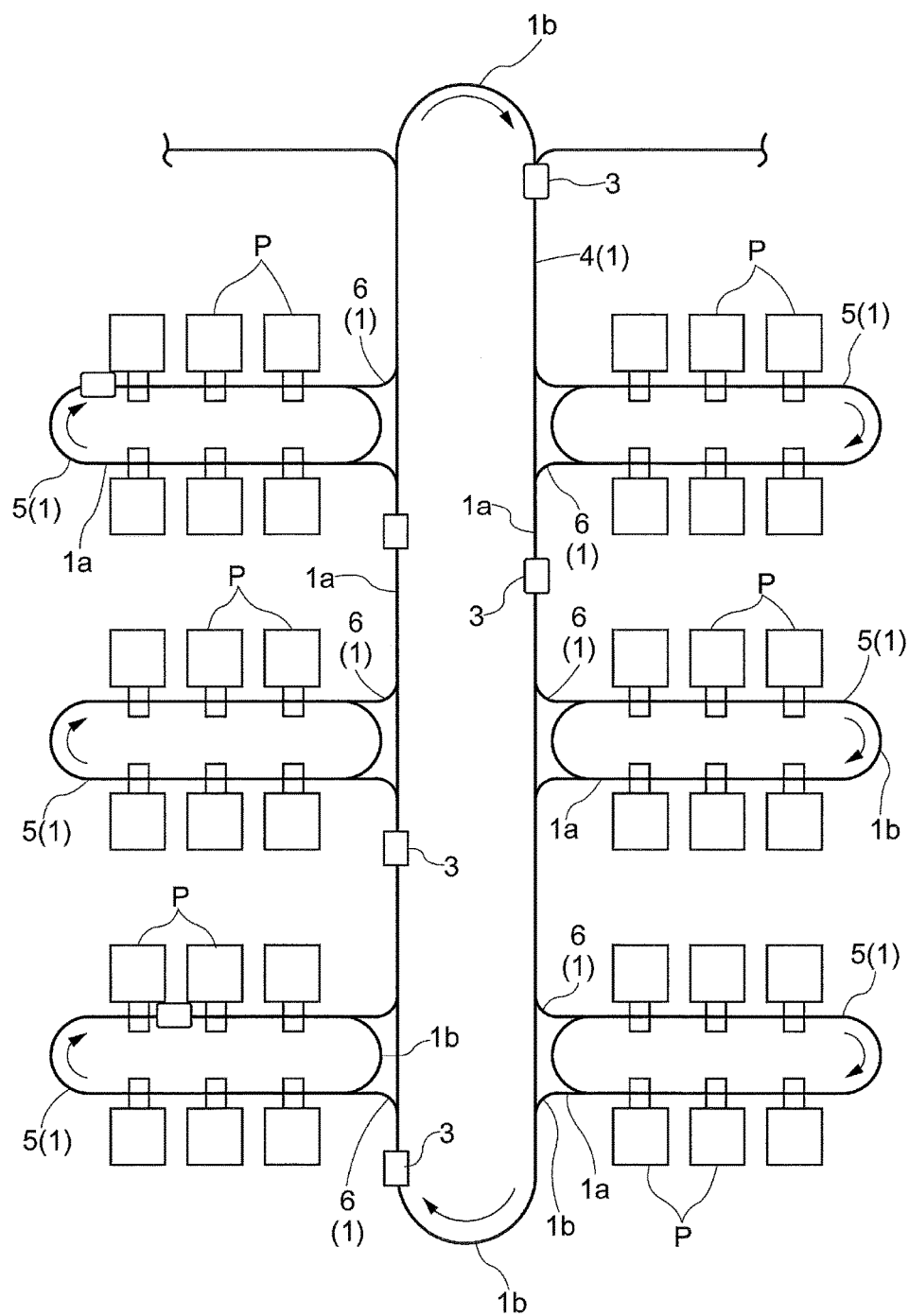
FIG. 1 is a plan view of an article transport facility.

As shown in FIG. 1, the article transport facility includes travel rails 2 arranged along travel paths 1, and article transport vehicles 3 that are guided by the travel rails 2 to travel along the travel paths 1. Note that, in the present embodiment, the article transport vehicles 3 transport, as articles W, FOUPs (Front Opening Unified Pod) for holding and carrying semiconductor substrates.

The travel paths 1 include one loop-shaped primary path 4, loop-shaped secondary paths 5 each of which extends along and by way of a plurality of article processors P, and connecting paths 6 for connecting the primary path 4 with the secondary paths 5. The travel paths 1 include a plurality of secondary paths 5. Each article transport vehicle 3 travels in the same direction (clockwise direction in FIG. 1) along the primary path 4 and the plurality of secondary paths 5. Note that, in FIG. 1, the travel directions of the article transport vehicles 3 are indicated by the arrows.

The travel paths 1 include curved portions 1b each having a curved shape, and straight portions 1a each having a linear or straight shape. More specifically, the primary path 4 is formed with a pair of straight portions 1a that are parallel to each other and a pair of curved portions 1b that connect ends of the straight portions 1a. Each of the plurality of secondary paths 5 is formed with a pair of straight portions 1a and a pair of curved portions 1b, as in the case of the primary path 4. Each connecting path 6 is formed with a curved portion 1b that is connected to the primary path 4 and a straight portion 1a that is connected to the corresponding secondary path 5. As such, each travel path 1 is formed with a combination of one or more straight portions 1a and one or more curved portions 1b.

In addition, provided as the connecting paths 6 are branching connecting paths 6 each for allowing the article transport vehicles 3 to travel into the corresponding secondary path 5 from the primary path 4, and merging connecting paths 6 each for allowing the article transport vehicles 3 to travel into the primary path 4 from the corresponding secondary path 5.

The article transport vehicle 3 is described next.

In the following description, the direction that is perpendicular to the fore and aft direction of the article transport vehicle 3 (referred to as the vehicle body fore and aft direction) in plan view will be referred to as the vehicle body lateral direction. In addition, in the description, the right direction and the left direction along the vehicle body lateral direction are defined as seen toward the front of the article transport vehicle 3 from the back. And, for travel portions 9, the travel direction is the direction perpendicular to the pivot axis of the travel wheels 15 in plan view; thus, the fore and aft direction of the article transport vehicle 3 and the travel direction of the travel portion 9 coincide with each other when the article transport vehicle 3 is traveling along a straight portion 1a of the travel path 1. In addition, for the travel paths 1, the direction along the travel path 1 will be referred to as the path longitudinal direction, and the direction perpendicular to the path longitudinal direction in plan view will be referred to as the path width direction, in the description. Incidentally, when, for example, the article transport vehicle 3 is traveling along a straight portion 1a of the travel path 1, the travel direction coincides with the path longitudinal direction and the vehicle body lateral direction coincides with the path width direction.

Figure 2:
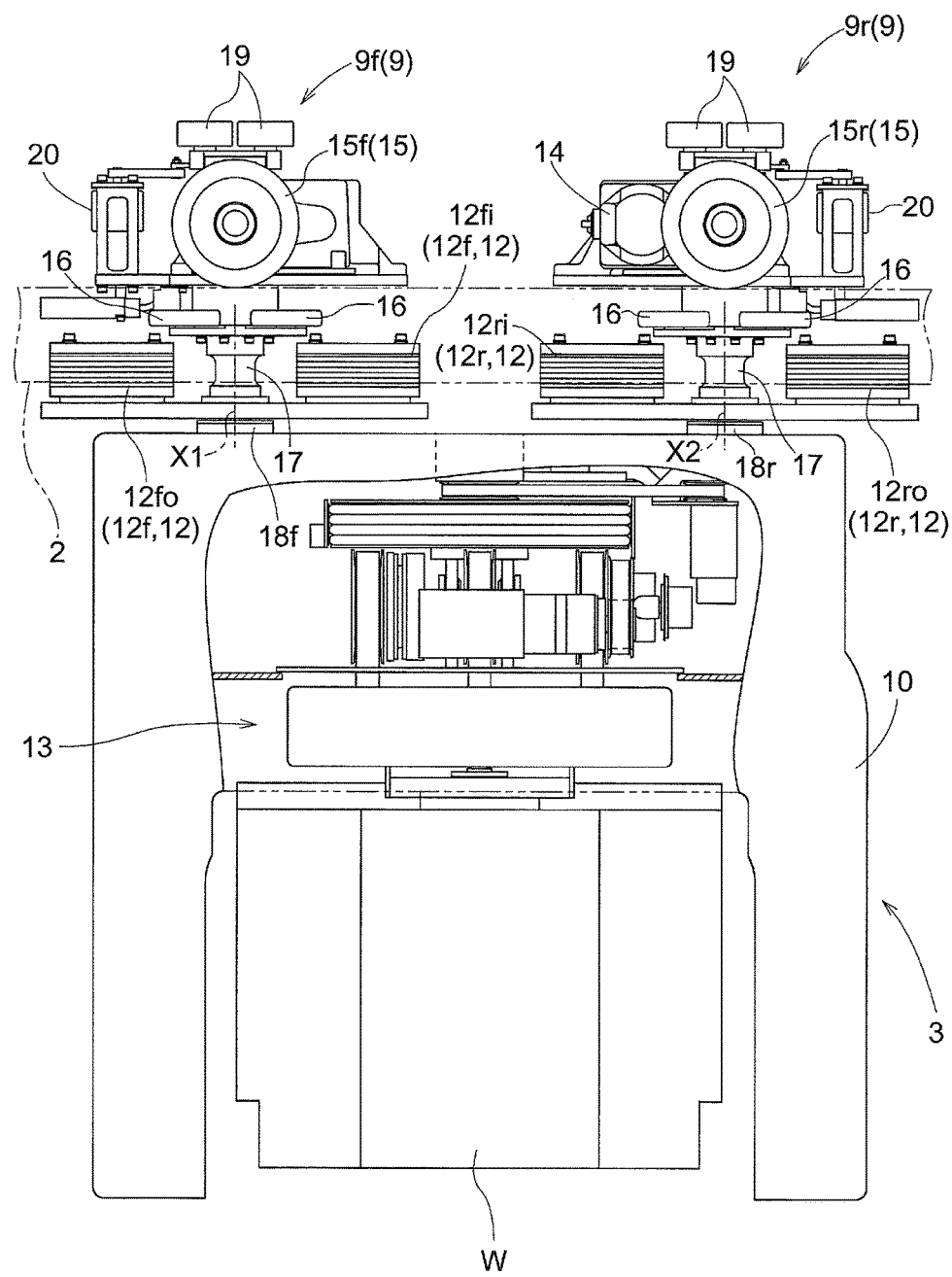
FIG. 2 is a side view of an article transport vehicle.
Figure 3:
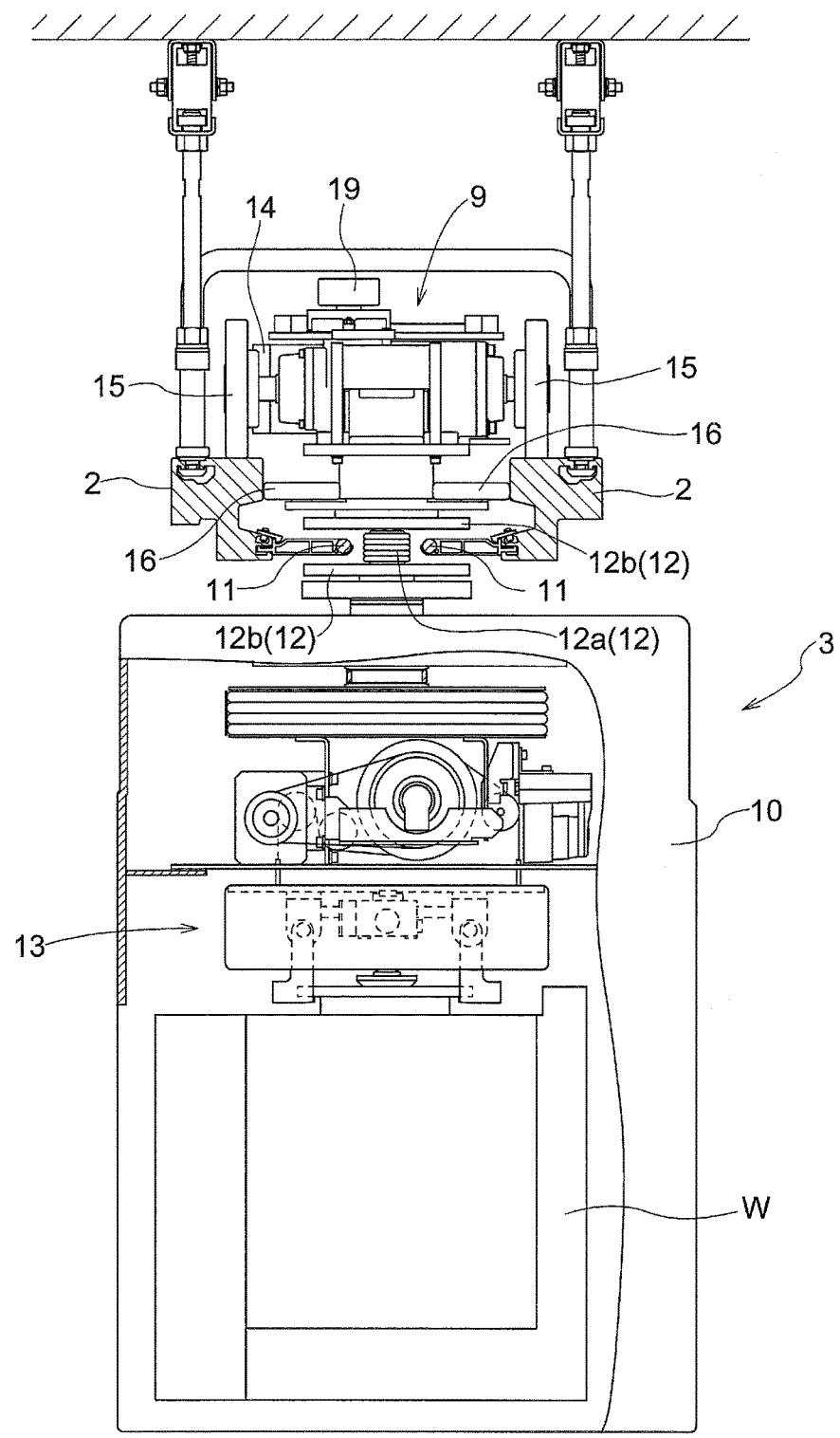
FIG. 3 is a front view of the article transport vehicle.
Figure 4:
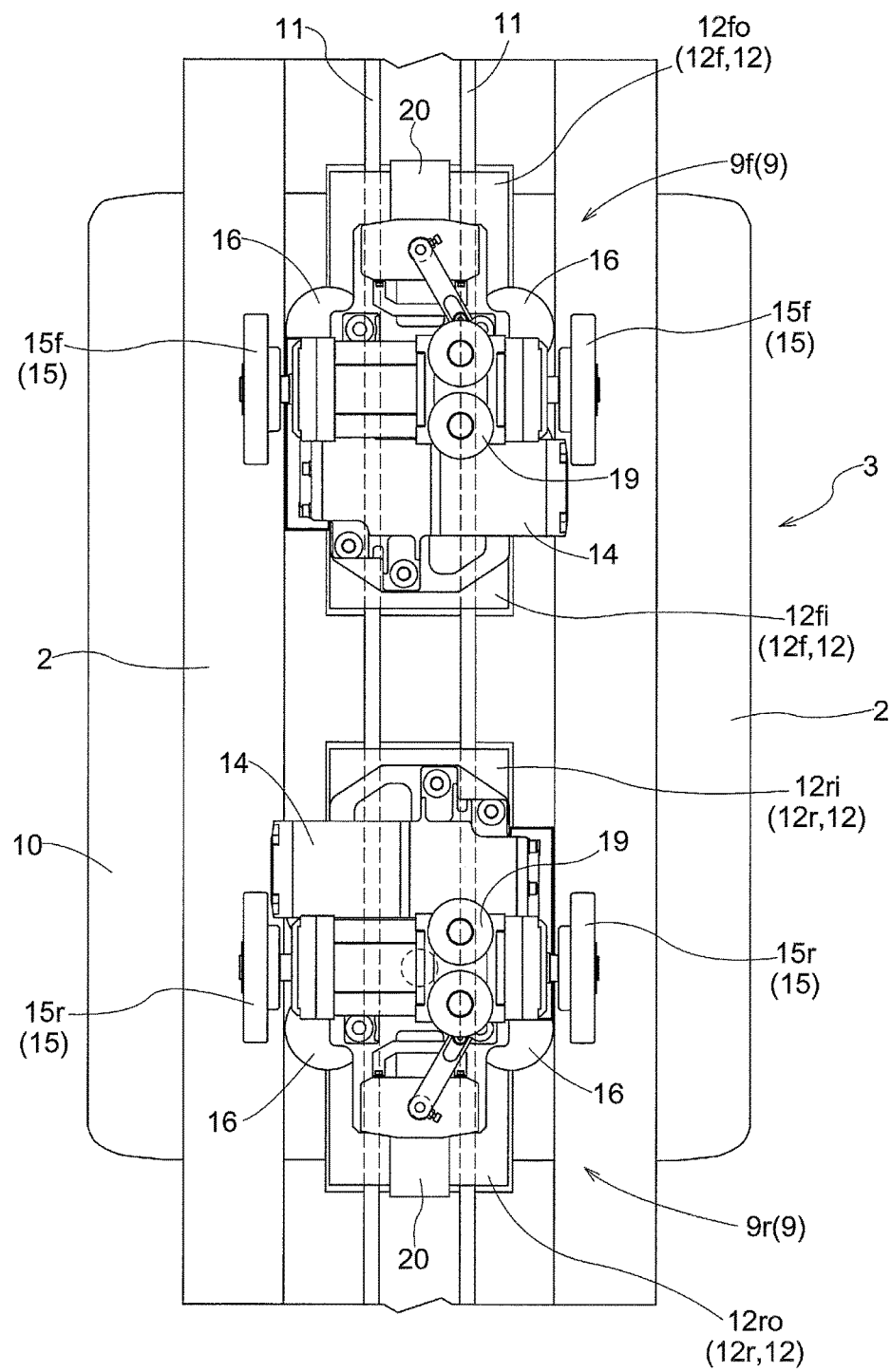
FIG. 4 is a plan view of the article transport vehicle.

As shown in FIGS. 2-4, the article transport vehicle 3 includes travel portions 9 configured to travel on and along a pair of right and left travel rails 2 which are suspended from and supported by the ceiling, a transport vehicle main body 10 located below the travel rails 2 and suspended from and supported by the travel portions 9, and power-receiving portions 12 for receiving driving electric power, without contact, from electricity supply lines 11 installed along the travel paths 1. The transport vehicle main body 10 has a support portion 13 for suspending and supporting an article W with the support portion 13 being movable relative to the support portion 13.

The travel portions 9 include a first travel portion 9f, and a second travel portion 9r spaced apart from the first travel portion 9f along the fore and aft direction. Note that, of the pair of the travel portions 9 spaced apart from each other along the fore and aft direction, the travel portion 9 located on the front side along the fore and aft direction is referred to as the first travel portion 9f whereas the travel portion 9 located on the back side along the fore and aft direction is referred to as the second travel portion 9r.

The first travel portion 9f includes a pair of right and left travel wheels 15 driven and rotated by an electric-powered actuating motor 14 such that they travel on travel surfaces formed by the respective top surfaces of the pair of right and left travel rails 2. In addition, the first travel portion 9f includes pairs of right and left guide wheels 16 which can rotate freely about respective axes (referred to as the vertical axes) extending along a vehicle body vertical direction which is perpendicular to the vehicle body lateral direction as seen along the vehicle body fore and aft direction, such that the guide wheels 16 are in contact with the inward surfaces of the pair of right and left travel rails 2. Note that two pairs of right and left guide wheels 16 are provided to the first travel portion 9f with one pair spaced apart from the other pair along the vehicle body fore and aft direction.

The second travel portion 9r includes a pair of right and left travel wheels 15 and two pairs of right and left guide wheels 16, as in the case of the first travel portion 9f.

Note that the travel wheels 15 provided to the first travel portion 9f are, or correspond to, the first travel wheels 15f, and the travel wheels 15 provided to the second travel portion 9r are, or correspond to, the second travel wheels 15r, and that the first travel wheels 15f and the second travel wheels 15r roll on the travel surfaces of the travel rails 2.

Each of the first travel portion 9f and the second travel portion 9r includes a connecting shaft 17 which projects downward to a point below the lower ends of the travel wheels 15. The transport vehicle main body 10 includes a first support mechanism 18f, and a second support mechanism 18r.

Figure 5:
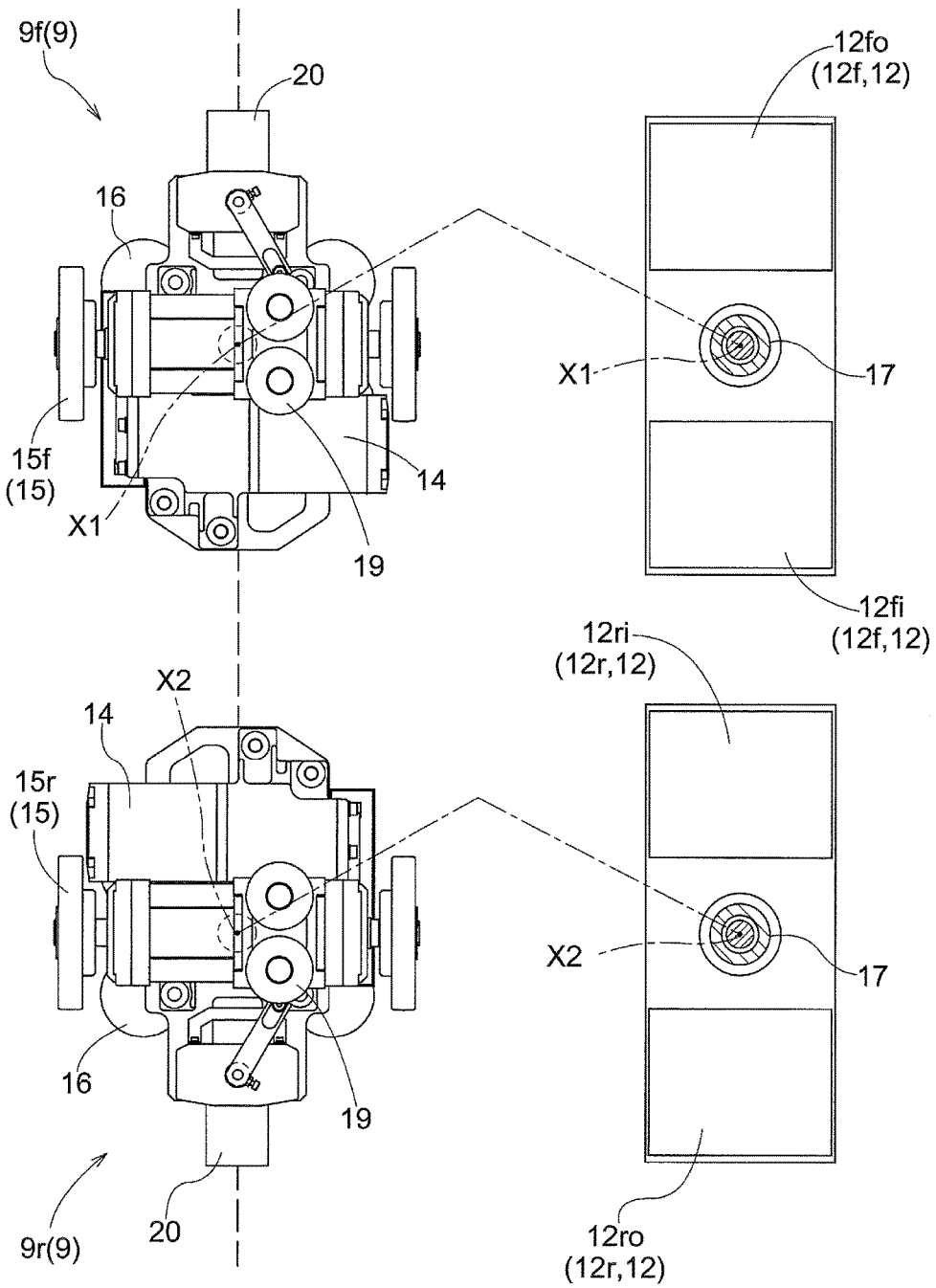
FIG. 5 shows the position of power-receiving portions when the article transport vehicle is traveling through a straight portion of a path.
Figure 6:
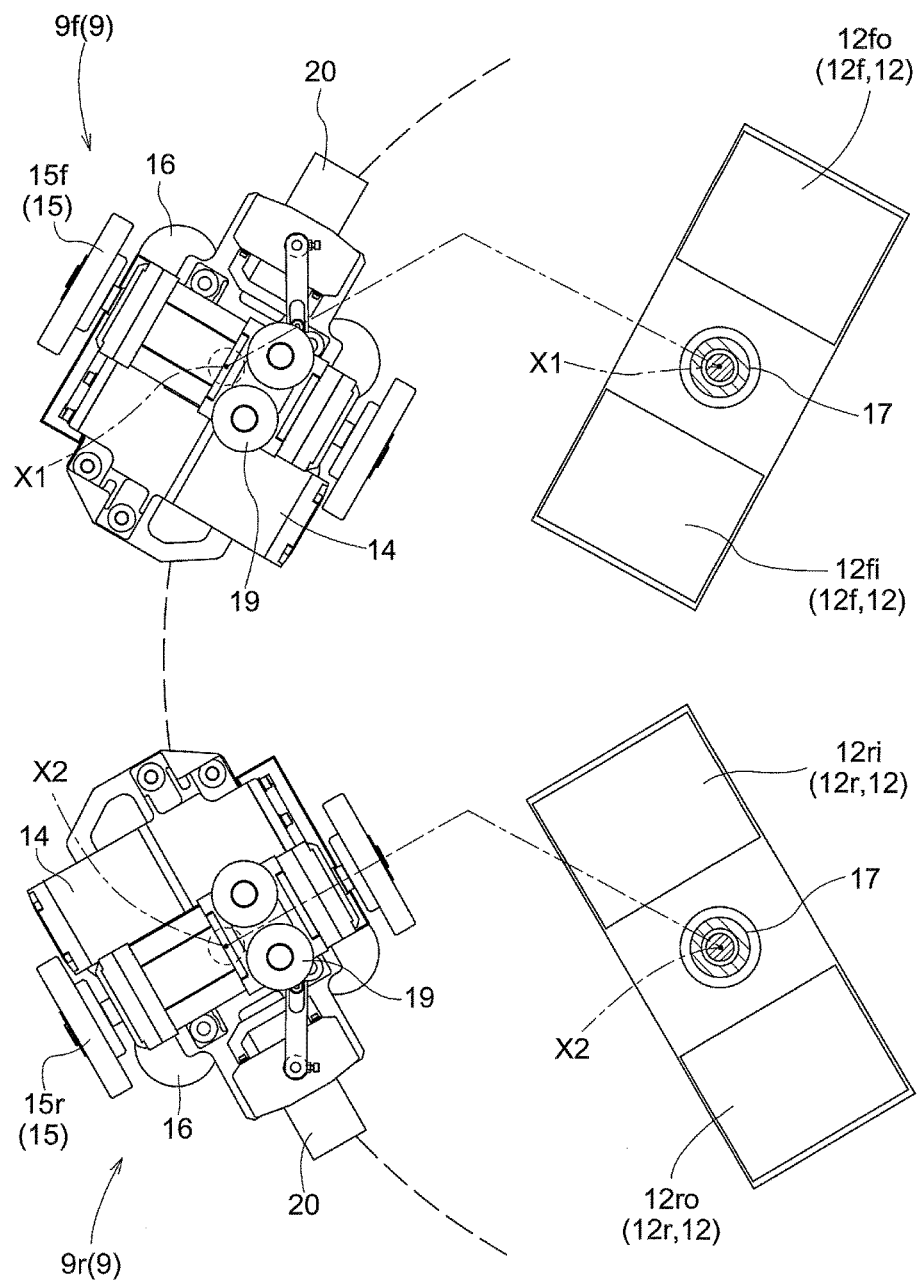
FIG. 6 shows the positions of the power-receiving portions when the article transport vehicle is traveling through a curved portion of the path.

As shown in FIGS. 2, 5 and 6, the connecting shaft 17 of the first travel portion 9f and the first support mechanism 18f of the transport vehicle main body 10 are connected to each other for relative rotation about a first axis X1 which extends along the vertical direction. By so connecting the first travel portion 9f and the transport vehicle main body 10 to each other, the first travel portion 9f supports the transport vehicle main body 10 through the first support mechanism 18f. In addition, the first travel portion 9f supports the first support mechanism 18f for rotation about the first axis X1 along the vertical direction.

The connecting shaft 17 of the second travel portion 9r and the second support mechanism 18r of the transport vehicle main body 10 are connected to each other for relative rotation about a second axis X2 which extends along the vertical direction. By so connecting the second travel portion 9r and the transport vehicle main body 10 to each other, the second travel portion 9r supports the transport vehicle main body 10 through the second support mechanism 18r. In addition, the second travel portion 9r supports the second support mechanism 18r for rotation about the second axis X2 along the vertical direction.

The first axis X1 is located in an area in which the first travel portion 9f exists along the travel direction and within a width of the first travel portion 9f along the vehicle body lateral direction, and is thus located such that it overlaps with the first travel portion 9f as seen along the vertical direction.

The second axis X2 is located in an area in which the second travel portion 9r exists along the travel direction and within a width of the second travel portion 9r along the vehicle body lateral direction, and is thus located such that it overlaps with the second travel portion 9r as seen along the vertical direction.

Each of the first travel portion 9f and the second travel portion 9r travels along the travel path 1 with its orientation maintained along the travel path 1 by virtue of the fact that the two pairs of guide wheels 16 provided to the travel portion 9f or 9r are in contact with, and thus guided by, the pair of travel rails 2. More specifically, when traveling along a straight portion 1a of the travel path 1, each of the first travel portion 9f and the second travel portion 9r travels in an orientation in which its travel direction is along the path longitudinal direction of the straight portion 1a. And when traveling along a curved portion 1b of the travel path 1, each of the first travel portion 9f and the second travel portion 9r travels in an orientation in which its travel direction is along the corresponding tangent direction of the curved portion 1b.

The power-receiving portions 12 include first power-receiving portions 12f which are rotated integrally with the first travel portion 9f about the first axis and second power-receiving portions 12r which are rotated integrally with the second travel portion 9r about the second axis.

The first power-receiving portions 12f include an outer first power-receiving portion 12fo and an inner first power-receiving portion 12fi. The second power-receiving portions 12r include an outer second power-receiving portion 12ro and an inner second power-receiving portion 12ri.

When the first travel portion 9f and the second travel portion 9r are in orientations along the fore and aft direction, these power-receiving portions 12 are lined up in a straight line with the outer first power-receiving portion 12fo, the inner first power-receiving portion 12fi, the inner second power-receiving portion 12ri, and the outer second power-receiving portion 12ro arranged in that order from the front along the fore and aft direction.

The outer first power-receiving portion 12fo is fixed to the connecting shaft 17 of the first travel portion 9f such that it is located on the front side of the connecting shaft 17 of the first travel portion 9f. The outer first power-receiving portion 12fo so arranged is located forward of the first axis X1.

The inner first power-receiving portion 12fi is fixed to the connecting shaft 17 of the first travel portion 9f such that it is located on the back side of the connecting shaft 17 of the first travel portion 9f. The inner first power-receiving portion 12fi so arranged is located rearward of the first axis X1.

The outer second power-receiving portion 12ro is fixed to the connecting shaft 17 of the second travel portion 9r such that it is located on the front side of the connecting shaft 17 of the second travel portion 9r. The outer second power-receiving portion 12ro so arranged is located forward of the second axis X2.

The inner second power-receiving portion 12ri is fixed to the connecting shaft 17 of the second travel portion 9r such that it is located on the back side of the connecting shaft 17 of the second travel portion 9r. The inner second power-receiving portion 12ri so arranged is located rearward of the second axis X2.

The outer first power-receiving portion 12fo, the inner first power-receiving portion 12fi, the inner second power-receiving portion 12ri, and the outer second power-receiving portion 12ro are formed to be rectangular and of the same dimensions and same shape in plan view. In addition, the outer first power-receiving portion 12fo, the inner first power-receiving portion 12fi, the inner second power-receiving portion 12ri, and the outer second power-receiving portion 12ro are all connected to corresponding one of the connecting shafts 17 in a similar fashion although their positions in the fore and aft direction relative to the corresponding connecting shaft 17 differ among some of them.

Thus, the power receiving portions 12 are constructed such that the distance from the first axis X1 to the forward end portion of the outer first power-receiving portion 12fo, the distance from the first axis X1 to the back end portion of the inner first power-receiving portion 12fi, the distance from the second axis X2 to the forward end portion of the inner second power-receiving portion 12ri, and the distance from the second axis X2 to the back end portion of the outer second power-receiving portion 12ro, are all identical.

As shown in FIGS. 3 and 4, a pair of electricity supply lines 11 are installed such that one electricity supply line 11 is located on each side of each power-receiving portion 12 along the path width direction in plan view.

Each power receiving portion 12 includes a first portion 12a which is located between, and at the same height as, the pair of electricity supply lines 11, and second portions 12b which extend to both sides from the first portion 12a along the vehicle body lateral direction and which are located both above and below the pair of electricity supply lines 11.

Each power receiving portion 12 includes, as the second portions 12b, a pair of second portions 12b consisting of an upper second portion 12b which extends to both sides along the vehicle body lateral direction from the upper end of the first portion 12a, and a lower second portion 12b which extends to both sides along the vehicle body lateral direction from the lower end of the first portion 12a.

As shown in FIGS. 2 and 3, provided in the first travel portion 9f are a pair of front and back guide auxiliary wheels 19 which are located above the travel wheels 15 and each of which rotates about a vertical axis, and an actuator 20 for integrally moving the pair of front and back guide auxiliary wheels 19 along the vehicle body lateral direction. Note that the second travel portion 9r also includes a pair of front and back guide auxiliary wheels 19 and an actuator 20 in the same fashion as with the first travel portion 9f.

Guide rails 21 for guiding the guide auxiliary wheels 19 are provided in connection portions in which a path in the travel paths 1 branches off from or merges into another path (examples of a connection portion include a portion in which the primary path 4 and a connecting path 6 are connected to each other, and a portion in which a secondary path 5 and a connecting path 6 are connected to each other). Each guide rail 21 is installed to be located above, and in a central area between in plan view, a pair of right and left travel rails 2.

And the first travel portion 9f is configured to move the position of the pair of front and back guide auxiliary wheels 19 to a right guiding position and to a left guiding position by moving the pair of front and back guide auxiliary wheels 19 along the vehicle body lateral direction, with the actuator 20. Here, the right guiding position is a position at which the pair of front and back guide auxiliary wheels 19 are located to the right of the center, along the vehicle body lateral direction, of the first travel portion 9f to contact the guide rail 21 from the right. And the left guiding position is a position at which the pair of front and back guide auxiliary wheels 19 are located to the left of the center, along the vehicle body lateral direction, of the first travel portion 9f to contact the guide rail 21 from the left.

As in the case of the first travel portion 9f, the second travel portion 9r is configured to move the position of the pair of front and back guide auxiliary wheels 19 to its right guiding position and to its left guiding position with its actuator 20.

Figure 8:
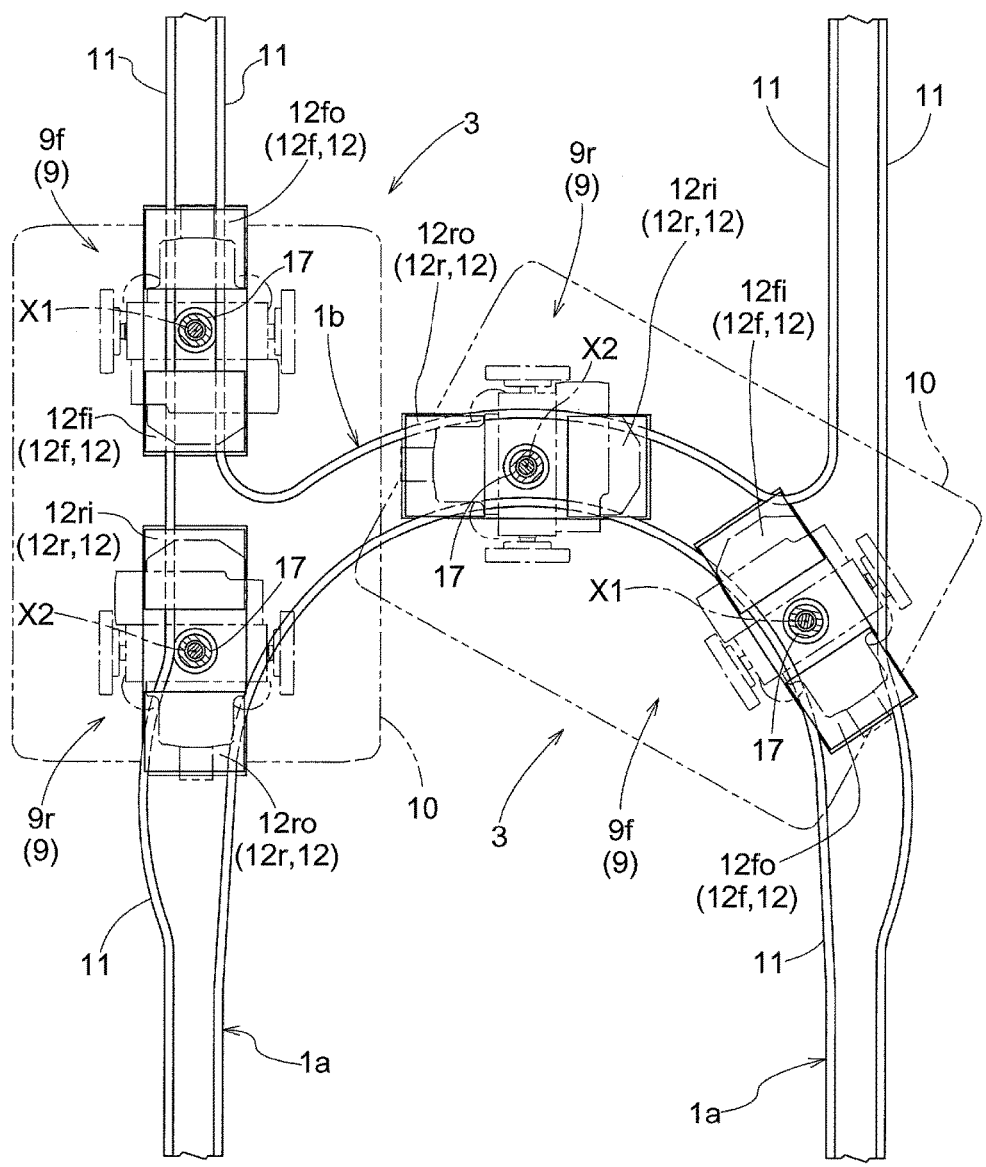
FIG. 8 is a plan view showing the positional relationships between electricity supply lines and the power-receiving portions.

In addition, the pair of electricity supply lines 11 are in general installed along each travel path 1; however, as shown in FIG. 8, in a location where two paths are connected to each other, such as a location where a secondary path 5 and a connecting path 6 are connected to each other, at least one line 11 of the pair of right and left electricity supply lines 11 installed along one of these paths has a discontinuous section in which the electricity supply one 11 is discontinuous along the path longitudinal direction.

The power receiving portions 12 provided to the article transport vehicle 3 are arranged such that the distance from the forward end to rearward end thereof (i.e., the distance from the forward end of the outer first power-receiving portion 12fo to the rearward end of outer second power-receiving portion 12ro) is greater than the distance, along the path width direction, between the pair of right and left travel rails 2 and thus is greater than the dimension or the length of a discontinuous section described above.

How the article transport vehicle 3 travels is described with reference to FIGS. 7 and 8.

Figure 7:
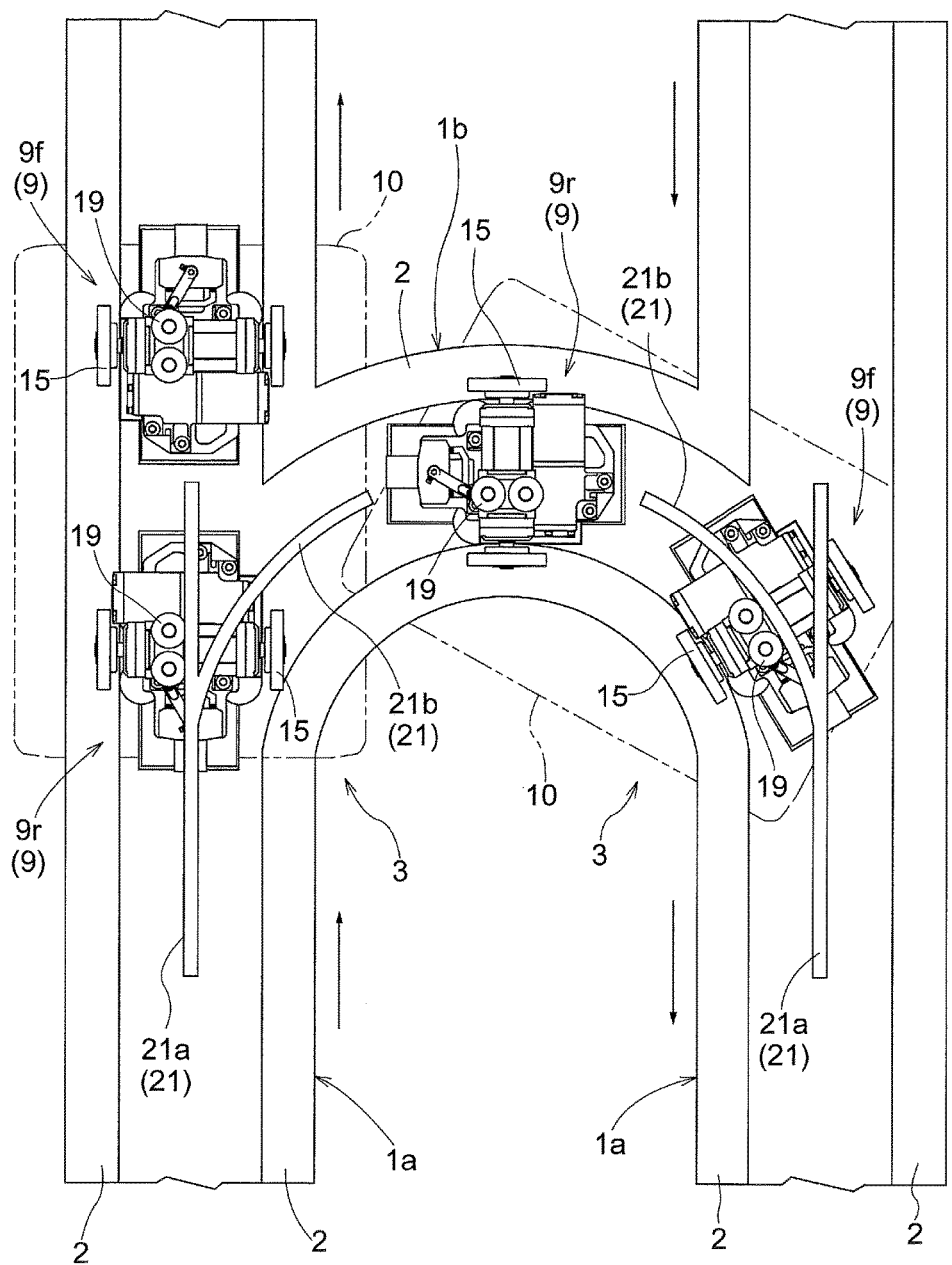
FIG. 7 is a plan view showing travel rails and guide rails.

As shown in FIG. 7, installed in the connection portion of the travel path 1 as guide rails 21 are a straight guide rail 21a installed along a straight portion 1a of the travel path 1, and a curved guide rail 21b installed along a curved portion 1b of the travel path 1.

And as shown in FIG. 7, when an article transport vehicle 3 that has been travelling along a secondary path 5 enters a connection portion that branches off from the secondary path 5 with the connection portion with the two pairs of front and back guide auxiliary wheels 19 (simply referred to hereinafter as the guide auxiliary wheels 19) moved to the left guiding position, the article transport vehicle 3 continues to travel with the guide auxiliary wheels 19 located on the left hand side of the straight guide rail 21a. Thus, the guide auxiliary wheels 19 will not be guided by the curved guide rail 21b, and the article transport vehicle 3 travels, or performs a "branching travel", from the straight portion 1a of the secondary path 5 to the straight portion 1a of the connecting path 6.

In addition, when the article transport vehicle 3 that has been traveling along the secondary path 5 enters the branching portion of the path with the guide auxiliary wheels 19 moved to the right guiding position, the article transport vehicle 3 travels with the guide auxiliary wheels 19 located on the right hand side of the straight guide rail 21a. Thus, the guide auxiliary wheels 19 are guided by the curved guide rail 21b, and the article transport vehicle 3 continues to travel along the secondary path 5 from the straight portion 1a toward and into the curved portion 1b.

As shown in FIG. 7, when the article transport vehicle 3 performs a branching travel from the straight portion 1a of the secondary path 5 to the straight portion 1a of the connecting path 6, the orientations of the power receiving portions 12 (the first power receiving portions 12f and the second power receiving portions 12r) are maintained to be along the fore and aft direction since the travel path 1 is straight. In addition, when the article transport vehicle 3 continues to travel along the secondary path 5 from the straight portion 1a to the curved portion 1b, the first power receiving portions 12f and the second power receiving portions 12r rotate about respective vertical axes so that the orientations of the power receiving portions 12 (the first power receiving portions 12f and the second power receiving portions 12r) are tilted, or at an angle or angles, with respect to the fore and aft direction in plan view, and are orientations along the tangential directions of the curved portion 1b.

The pair of electricity supply lines 11 installed in the curved portion 1b extend to form curves in plan view. In this curved portion 1b, the pair of electricity supply lines 11 are installed such that the distance between the pair of electricity supply lines 11 along the path width direction in the curved portion 1b is greater than the distance along the path width direction in a straight portion 1a so that the pair of electricity supply lines 11 would not come into contact with the first power receiving portions 12f and the second power receiving portions 12r.

To describe in more detail, as shown in FIG. 8, the distance between the pair of electricity supply lines 11 in the straight portion 1a is set to be a distance that is greater than the width, along the vehicle width direction, of the first portion 12a of each power receiving portion 12 and that is less than the width, along the vehicle width direction, of the second portions 12*b*, when the power receiving portions 12 are oriented along the fore and aft direction (i.e., oriented along the path longitudinal direction).

In addition, the pair of electricity supply lines 11 in a curved portion 1*b* are tilted, or at an angle or angles, with respect to the fore and aft direction in plan view. And the distance between the pair of electricity supply lines 11 in the curved portion 1*b* is set to be a distance that is greater than the width, along the vehicle width direction, of the first portion 12*a* of each power receiving portion 12 and that is less than the width, along the vehicle width direction, of the second portions 12*b*, when the power receiving portions 12 are oriented along the tangential directions direction of the curbed portion 1*b*.

And each of the pair of second portions 12*b* of each power receiving portion 12 overlaps with both of the pair of electricity supply lines 11 as seen along the vertical direction not only when traveling through the straight portion 1*a* of the travel path 1, but also when traveling through the curved portion 1*b*.

As shown in FIG. 8, in the first travel portion 9*f*, the inner first power-receiving portion 12*fi* starts to rotate about the first axis of the first travel portion 9*f* before the inner first power-receiving portion 12*fi* enters the curved portion 1*b* when the article transport vehicle 3 travels from the straight portion 1*a* to the curved portion 1*b*. Thus, in spite of the fact that the inner first power-receiving portion 12*fi* is located in the straight portion 1*a*, the inner first power-receiving portion 12*fi* projects in the opposite direction (toward left) along the path width direction, from the direction toward which the curved portion 1*b* curves (i.e., toward right). Incidentally, in the second travel portion 9*r*, the outer second power-receiving portion 12*ro* projects as in the case of the first travel portion 9*f*.

Thus, in an end portion of the straight portion 1*a*, the electricity supply line 11 of the pair of electricity supply lines 11 that is located on the opposite side (left hand side) along the path width direction from the direction (toward right) toward which the curved portion 1*b* curves is shaped to bulge outward (toward left) in plan view, so that these power-receiving portions 12 would not interfere or come into contact with the electricity supply lines 11 even if the inner first power-receiving portion 12*fi* and the outer second power-receiving portion 12*ro* project to one side.

In addition, in a beginning portion of the straight portion 1*a*, the electricity supply line 11 of the pair of electricity supply lines 11 that is located on the opposite side (left hand side) along the path width direction from the direction (toward right) toward which the curved portion 1*b* curves is shaped to bulge outward (toward left) in plan view.

Alternative Embodiments (1) In the embodiment described above, the power receiving portions 12 are constructed such that the distance from the first axis X1 to the forward end portion of the outer first power-receiving portion 12*fo*, the distance from the first axis X1 to the back end portion of the inner first power-receiving portion 12*fi*, the distance from the second axis X2 to the forward end portion of the inner second power-receiving portion 12*ri*, and the distance from the second axis X2 to the back end portion of the outer second power-receiving portion 12*ro*, are all identical to one another. However, the power-receiving portions 12 may also be constructed such that some or all of such distances may be different from each other. More specifically, for example, the distance from the first axis X1 to the forward end portion of the outer first power-receiving portion 12*fo* and the distance from the second axis X2 to the back end portion of the outer second power-receiving portion 12*ro* may be set to be identical to each other (first distance) whereas the distance from the first axis X1 to the back end portion of the inner first power-receiving portion 12*fi* and the distance from the second axis X2 to the forward end portion of the inner second power-receiving portion 12*ri* may be set to be identical to each other (second distance), so that the first distance is different from the second distance. Here, the first distance may be less than the second distance.

(2) In the embodiment described above, the outer first power-receiving portion 12*fo* and the inner first power-receiving portion 12*fi* are provided as the first power-receiving portions 12*f*. However, it is not necessary to provide one or the other of the outer first power-receiving portion 12*fo* and the inner first power-receiving portion 12*fi*. In addition, although the inner second power-receiving portion 12*ri* and the outer second power-receiving portion 12*ro* are provided as the second power-receiving portions 12*r*, it is not necessary to provide one or the other of the inner second power-receiving portion 12*ri* and the outer second power-receiving portion 12*ro*.

(3) In the embodiment described above, each power-receiving portion 12 is formed to have a shape of a pair of $C_5$ with sharp corners and placed back to back (or a pair of brackets placed back to back) that open toward one and the other side along the vehicle body lateral direction as seen along the travel direction. However, the shape of each power-receiving portion 12 may be changed suitably. More specifically, each power-receiving portion 12 may be formed to have a shape of a C with sharp corners (or of a bracket) that opens only toward one side along the vehicle body lateral direction as seen along the travel direction. Alternatively, each power-receiving portion 12 may be formed to have a shape of a pair of Es placed back to back that open toward one and the other side along the vehicle body lateral direction as seen along the travel direction.

(4) In the embodiment described above, the electricity supply lines 11 are installed on both sides, along the path width direction, of the power-receiving portions 12 as seen along the vertical direction. However, one or more electricity supply lines 11 may be installed only on one side, along the path width direction, of the power-receiving portions 12 as seen along the vertical direction.

(5) In the embodiment described above, the pair of electricity supply lines 11 are installed such that the distance between the pair of electricity supply lines 11 along the path width direction in a curved portion 1*b* of the travel path 1 is greater than the distance between them along the path width direction in a straight portion 1*a*. However, the pair of electricity supply lines 11 may be installed such that the distance between the pair of electricity supply lines 11 along the path width direction in a straight portion 1*a* is equal to the distance between them along the path width direction in a curved portion 1*b* of the travel path 1.

[Summary of Embodiments Described Above]

A brief summary of the article transport facility described above is provided next.

An article transport facility comprises a travel rail installed along a travel path; an article transport vehicle configured to be guided by the travel rail to travel along the travel path; wherein the travel path includes a straight portion which extends straight and a curved portion which is curved, wherein the article transport vehicle includes a transport vehicle main body, a first travel portion having a first travel wheel, a second travel portion having a second travel wheel, and power-receiving portions for receiving driving electric power, without contact, from one or more electricity supply lines installed along the travel path, wherein the first travel portion and the second travel portion are spaced apart from each other along a travel direction of the article transport vehicle, wherein the first travel wheel is provided to the first travel portion such that the first travel wheel can roll on a travel surface of the travel rail, wherein the first travel portion supports the transport vehicle main body through a first support mechanism and is guided by the travel rail, wherein the first travel portion supports the first support mechanism for rotation about a first axis which extends along a vertical direction, wherein the first axis is so located to overlap with the first travel portion as seen along the vertical direction, wherein the second travel wheel is provided to the second travel portion such that the second travel wheel can roll on the travel surface of the travel rail, wherein the second travel portion supports the transport vehicle main body through a second support mechanism and is guided by the travel rail, wherein the second travel portion supports the second support mechanism for rotation about a second axis which extends along a vertical direction, wherein the second axis is so located to overlap with the second travel portion as seen along the vertical direction, and wherein the power-receiving portions include one or more first power-receiving portions which are configured to be rotated integrally with the first travel portion about the first axis, and one or more second power-receiving portions which are configured to be rotated integrally with the second travel portion about the second axis.

As such, when the article transport vehicle travels from a straight portion of the travel path into a curved portion, the first travel portion is rotated about the first axis whereas the second travel portion is rotated about the second axis. And thus, each of the first travel portion and the second travel portion travels along the curved portion.

As this takes place, the one or more first power-receiving portions are rotated integrally with the first travel portion about the first axis whereas the one or more second power-receiving portions are rotated integrally with the second travel portion about the second axis so that the orientations of the one or more first power-receiving portions and the one or more second power-receiving portions can be changed to match the arrangement of the one or more electricity supply lines in the curved portion.

The arrangement for causing the one or more first power-receiving portions to be rotated integrally with the first travel portion about the first axis and the arrangement for causing the one or more second power-receiving portions to be rotated integrally with the second travel portion about the second axis may be achieved by a simple structure, for example, by fixing the one or more first power-receiving portions to the first travel portion, and fixing the one or more second power-receiving portions to the second travel portion. Thus, an article transport facility is provided in which positions of power-receiving portions can be changed by a simple structure when the article transport vehicle travels through a curved portion of a path.

Here, the one or more electricity supply lines preferably include a pair of electricity supply lines with one electricity supply line located on each side of the power-receiving portions along a path width direction which is perpendicular to a longitudinal direction of the travel path as seen along the vertical direction.

With the arrangement described above, the power-receiving portions can receive driving electric power from both of the pair of electricity supply lines located on both sides along the path width direction; thus, the amount of electric power received from the electricity supply lines can be increased.

In addition, with a direction that points toward the first travel portion from the second travel portion along the travel direction being defined to be a first direction, and a direction opposite from the first direction being defined to be a second direction, the one or more first power-receiving portions preferably include an outer first power-receiving portion located on a first direction side of the first axis and an inner first power-receiving portion located on a second direction side of the first axis wherein the one or more second power-receiving portions include an inner second power-receiving portion located on a first direction side of the second axis and an outer second power-receiving portion located on a second direction side of the second axis.

With the arrangement described above, the power-receiving portions include the outer first power-receiving portion located on a first direction side of the first axis and the outer second power-receiving portion located on a second direction side of the second axis in addition to the inner first power-receiving portion and inner second power-receiving portion which are located between the first axis and the second axis. Thus, by providing power-receiving portions at a position on the first direction side of the first axis, and at a position on the second direction side of the second axis in addition to providing power-receiving portions between the first axis and the second axis, the power-receiving portions can be distributed over a large distance, or a wide range, along the travel direction of the article transport vehicle.

And so, even where an electricity supply line is discontinuous along the path longitudinal direction, for example, in a portion in which a travel path branches off from or merges into another travel path, this arrangement makes it easier to avoid a situation in which all of the power-receiving portions along the path longitudinal direction are moved away from the electricity supply line because the power-receiving portions are distributed over a large distance, or a wide range, along the travel direction of the article transport vehicle. Thus, the power-receiving portions can receive power from electricity supply lines with improved stability.

Also, the power-receiving portions are preferably constructed such that a distance from the first axis to a first direction side end portion of the outer first power-receiving portion, a distance from the first axis to a second direction side end portion of the inner first power-receiving portion, a distance from the second axis to a first direction side end portion of the inner second power-receiving portion, and a distance from the second axis to a second direction side end portion of the outer second power-receiving portion are identical to one another.

With the arrangement described above, when, for example, the first travel portion is rotated in one direction about the first axis and the second travel portion is rotated in the opposite direction about the second axis, the amounts of movements, along the path width direction, of the first direction side end portion of the outer first power-receiving portion and of the second direction side end portion of the outer second power-receiving portion can be made equal to each other. Also, the amounts of movements of the second direction side end portion of the inner first power-receiving portion and of the first direction end side of the inner second power-receiving portion to the opposite direction along the path width direction can be made equal to each other.

Thus, the positional relationship between the first power-receiving portions and the electricity supply lines and the positional relationship between the second power-receiving portions and the electricity supply lines can be made identical to each other. Therefore, by arranging the electricity supply lines provided along a curved portion at positions that are appropriate for the first power-receiving portions, the electricity supply lines are also arranged at appropriate positions for the first power-receiving portions. Therefore, power supply efficiency of the first power-receiving portions and the second power-receiving portions from the electricity supply lines can be improved.

In addition, the pair of electricity supply lines are preferably installed such that a distance between the pair of electricity supply lines in the curved portion along the path width direction is greater than a distance between the pair of electricity supply lines in the straight portion along the path width direction.

With the arrangement described above, for a straight portion of the travel path, the power-receiving portions can efficiently receive power from the pair of electricity supply lines by arranging the distance between the pair of electricity supply lines to be one that is suitable for the dimension, along the path width direction, of the power-receiving portions. In addition, in a curved portion of the travel path, the one or more first power-receiving portions are rotated about the first axis as the first travel portion is rotated about the first axis whereas the one or more second power-receiving portions are rotated about the second axis as the second travel portion is rotated about the second axis. Therefore, in a curved portion of the travel path, the one or more first power-receiving portions and the one or more second power-receiving portions may be displaced outward along the path width direction, compared to a straight portion of the travel path. As such, there is a possibility that the power-receiving portions may interfere or come into contact with the electricity supply lines if the pair of electricity supply lines are provided at the same distance from each other as in the straight portion of the travel path. However, the power-receiving portions interfering or coming into contact with the electricity supply lines can be avoided by increasing the distance between the pair of the electricity supply lines.

Also, each of the power-receiving portions preferably includes a first portion located between the pair of electricity supply lines and at a same height as the pair of electricity supply lines, and a pair of second portions with each second portion extending to one side and to the other side along the path width direction from the first portion, and with one second portion located above the pair of electricity supply lines and the other second portion located below the pair of electricity supply lines, wherein each of the pair of second portions preferably overlaps with each of the pair of electricity supply lines as seen along the vertical direction.

With the arrangement described above, each power-receiving portion can receive power from the sides of the pair of electricity supply lines through the first portion, and can receive power from above and below the pair of electricity supply lines through the pair of second portions. Thus, the power-receiving portions can receive power from the pair of electricity supply lines from a number of radial directions centering on the axial or longitudinal direction along each of the pair of electricity supply lines, and can therefore receive power efficiently from the electricity supply lines.

What is claimed is:

1. An article transport facility comprising:
a travel rail installed along a travel path;
an article transport vehicle configured to be guided by the travel rail to travel along the travel path;
wherein the travel path includes a straight portion which extends straight and a curved portion which is curved,
wherein the article transport vehicle includes a transport vehicle main body, a first travel portion having a first travel wheel, a second travel portion having a second travel wheel, and power-receiving portions for receiving driving electric power, without contact, from one or more electricity supply lines installed along the travel path,
wherein the first travel portion and the second travel portion are spaced apart from each other along a travel direction of the article transport vehicle,
wherein the first travel wheel is provided to the first travel portion such that the first travel wheel can roll on a travel surface of the travel rail,
wherein the first travel portion supports the transport vehicle main body through a first support mechanism and is guided by the travel rail,
wherein the first travel portion supports the first support mechanism for rotation about a first axis which extends along a vertical direction,
wherein the first axis is so located to overlap with the first travel portion as seen along the vertical direction,
wherein the second travel wheel is provided to the second travel portion such that the second travel wheel can roll on the travel surface of the travel rail,
wherein the second travel portion supports the transport vehicle main body through a second support mechanism and is guided by the travel rail,
wherein the second travel portion supports the second support mechanism for rotation about a second axis which extends along a vertical direction,
wherein the second axis is so located to overlap with the second travel portion as seen along the vertical direction, and
wherein the power-receiving portions include one or more first power-receiving portions which are configured to be rotated integrally with the first travel portion about the first axis, and one or more second power-receiving portions which are configured to be rotated integrally with the second travel portion about the second axis.

2. The article transport facility as defined in claim 1, wherein the one or more electricity supply lines include a pair of electricity supply lines with one electricity supply line located on each side of the power-receiving portions along a path width direction which is perpendicular to a longitudinal direction of the travel path as seen along the vertical direction.

3. The article transport facility as defined in claim 2, wherein with a direction that points toward the first travel portion from the second travel portion along the travel direction being defined to be a first direction, and a direction opposite from the first direction being defined to be a second direction, the one or more first power-receiving portions include an outer first power-receiving portion located on a first direction side of the first axis and an inner first power-receiving portion located on a second direction side of the first axis, and
wherein the one or more second power-receiving portions include an inner second power-receiving portion located on a first direction side of the second axis and an outer second power-receiving portion located on a second direction side of the second axis.

4. The article transport facility as defined in claim 3, wherein the power-receiving portions are constructed such that a distance from the first axis to a first direction side end portion of the outer first power-receiving portion, a distance from the first axis to a second direction side end portion of the inner first power-receiving portion, a distance from the second axis to a first direction side end portion of the inner second power-receiving portion, and a distance from the second axis to a second direction side end portion of the outer second power-receiving portion are identical to one another.

5. The article transport facility as defined in claim 2, wherein the pair of electricity supply lines are installed such that a distance between the pair of electricity supply lines in the curved portion along the path width direction is greater than a distance between the pair of electricity supply lines in the straight portion along the path width direction.

6. The article transport facility as defined in claim 2, wherein each of the power-receiving portions includes a first portion located between the pair of electricity supply lines and at a same height as the pair of electricity supply lines, and a pair of second portions with each second portion extending to one side and to the other side along the path width direction from the first portion, and with one second portion located above the pair of electricity supply lines and the other second portion located below the pair of electricity supply lines, and wherein each of the pair of second portions overlaps with each of the pair of electricity supply lines as seen along the vertical direction.

\* \* \* \* \*